United States Patent [19]

Mimoun et al.

[11] 3,956,473

[45] May 11, 1976

[54] PROCESS FOR OXIDIZING HYDROGEN SULFIDE TO SULFUR BY MEANS OF MOLECULAR OXYGEN IN THE PRESENCE OF TRANSITION METAL COMPLEXES AS CATALYSTS

[75] Inventors: Hubert Mimoun, Paris; Christian Bocard, Orgeval; Irenee Seree De Roch, Rueil-Malmaison, all of France

[73] Assignee: Institut Francais du Petrole, des Carburants et Lubrifiants, Rueil-Malmaison, France

[22] Filed: Oct. 1, 1973

[21] Appl. No.: 402,052

[30] Foreign Application Priority Data

Oct. 2, 1972 France .............................. 72.34901
Nov. 17, 1972 France .............................. 72.41059

[52] U.S. Cl. ........................ 423/573 R; 423/226
[51] Int. Cl.$^2$ .................................... C01B 17/04
[58] Field of Search .......... 423/226, 227, 571, 573; 260/429 J; 252/431 R

[56] References Cited
UNITED STATES PATENTS

| | | | |
|---|---|---|---|
| 1,989,004 | 1/1935 | Fife ..................................... | 423/228 |
| 2,972,522 | 2/1961 | Urban ................................. | 423/573 |
| 3,087,793 | 4/1963 | Hay ..................................... | 423/573 |
| 3,363,989 | 1/1968 | Deal et al. ......................... | 423/226 X |
| 3,622,273 | 11/1971 | Roberts ............................. | 423/573 X |
| 3,777,010 | 12/1973 | Nicksic et al. ..................... | 423/573 |
| 3,793,440 | 2/1974 | Schulze ............................. | 423/573 |

FOREIGN PATENTS OR APPLICATIONS 1,141,619  1/1956  France
341,684  1/1931  United Kingdom

OTHER PUBLICATIONS

"Chemical Abstracts", Vol. 41, 1947, pp. 1635–1636.
Martell and Calvin, *Chemistry of the Metal Chelate Compounds*, Prentice Hall, Englewood, N.J., 1956, pp. 55–60.

*Primary Examiner*—G. O. Peters
*Attorney, Agent, or Firm*—Millen, Raptes & White

[57] ABSTRACT

Catalytic oxidation of hydrogen sulfide to sulfur in homogeneous liquid phase, by means of molecular oxygen, in an organic solvent whose water content is lower than 60% by volume, said liquid phase comprising a solvent selected from amides, phosphoramides, sulfoxides, nitriles and ethers, said oxidation being conducted in the presence of at least one catalyst selected from the two following categories:

a. a chelate of a transition metal selected from the group of metals consisting of iron, manganese, copper and cobalt, the chelate being selected from the group consisting of dialkyldithiocarbamates, alkylxanthates, dithiolates, 8-hydroxyquinolinates and salicylaldimines, b. a salt of said transition metal of the formula $MX_m$ in which M is the transition metal, X is an anion selected from the group consisting of $Cl^-$, $Br^-$, $ClO_4^-$, $NO_3^-$ and $SCN^-$ and $m$ is 2 or 3.

8 Claims, No Drawings

PROCESS FOR OXIDIZING HYDROGEN SULFIDE TO SULFUR BY MEANS OF MOLECULAR OXYGEN IN THE PRESENCE OF TRANSITION METAL COMPLEXES AS CATALYSTS

This invention has for an objective the removal of hydrogen sulfide from gas effluents by oxidizing the same to sulfur and water in the liquid phase by means of molecular oxygen and in the presence of catalysts consisting of chelates or transition metal salts.

The process of the invention in which a gaseous mixture containing hydrogen sulfide is contacted with a molecular oxygen containing-gas is remarkable in that, on the one hand, it is conducted in a solvent selected from the group consisting of amides, phosphoramides, sulfoxides, nitriles and ethers and that, on the other hand, it is conducted in the presence of at least one catalyst selected from the following categories:

a. a chelate of a transition metal selected from the group of metals consisting of iron, manganese, copper and cobalt, the chelate being selected from the group consisting of dialkyldithiocarbamates, alkylxanthates, dithiolates, 8-hydroxyquinolinates and salicylaldimines and, b. a salt of said transition metal of the general formula $MX_m$ in which M is said transition metal, X an anion selected from the group consisting from $Cl^-$, $Br^-$, $ClO_4^-$, $NO_3^-$ and $SCN^-$, and $m$ is 2 or 3.

Up to now, the above-described oxidation reaction was carried out in an aqueous solvent; in contrast thereto, according to the invention, there is used any organic solvent for the catalyst, of the basic type, selected from the group consisting of amides, phosphoramides, sulfoxides, nitriles and ethers.

The amides which can be used are preferably tertiary, linear or cyclic amides; there can be mentioned for example dimethylformamide, dimethylacetamide and N-methylpyrrolidone.

As phosphoramides, there can be used for example, hexamethyl-phosphoramide or hexaethylphosphoramide.

As sulfoxides, the dimethyl and diethyl sulfoxide are particularly convenient for the reaction.

The nitriles may consist for example of acetonitrile or propionitrile. The linear and branched ethers, are both convenient for the reaction. By way of non-limitative examples, there can be mentioned ethyleneglycol, monomethyl- or dimethyl-ether or tetrahydrofuran.

The reaction may be conducted in an anhydrous medium, but it is also possible to add water to the medium without changing the reaction conditions substantially. It must be remembered, however, that water is formed during the reaction. The acceptable concentration of water in the medium may vary from 0 to 60% by volume and preferably must not be in excess of 20% by volume and in any way must be lower than the limit of solubility of water in the solvent.

During the reaction, there is obtained pure and crystallized sulfur which can be easily recovered, for example by filtration or by other equivalent means.

The molecular oxygen-containing gas is used either in the form of pure oxygen or diluted oxygen, for example in the form of air.

The reaction temperature may be from about −20° to +200°C, but is preferably from +5° to +180°C.

The reaction medium contains in solution the catalyst for the oxidation of hydrogen sulfide to sulfur.

The reaction catalyst may, according to a first possibility, consist of a chelate of a transition metal selected from iron, manganese, copper and cobalt. The chelating part of the complex may be a Schiff base, a dialkyl dithiocarbamate, an alkyl xanthate, a dithiolate or a 8-hydroxyquinolinate or any other equivalent compound.

As chelates having a catalytic activity for converting $H_2S$ to sulfur, there can be mentioned as examples:

1. iron, copper, cobalt or manganese complexes with Schiff bases, such salicylaldimines which correspond to the following formulae $F_1$ and $F_2$:

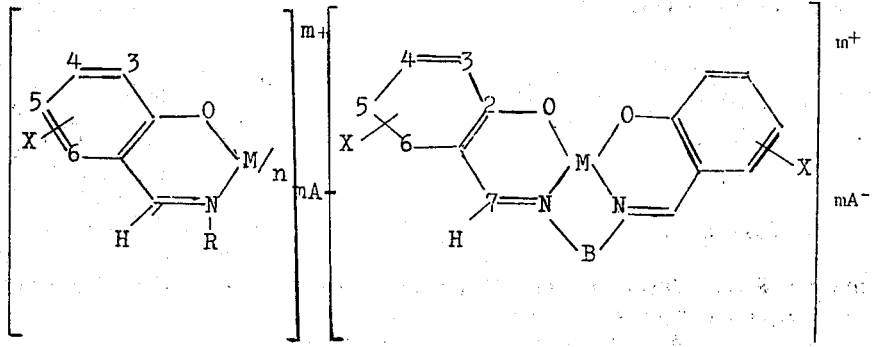

in which:

X is a substituent: H, alkyl, aryl, aralkyl having 1 to 20 carbon atoms,

R is a substituent: H, alkyl, aryl, aralkyl having from 1 to 20 carbon atoms,

B is a radical: polymethylene, optionally substituted with alkyl, aryl or aralkyl radicals having from 1 to 10 carbon atoms, A is an anion: carboxylates, chloride . . . and the like, M is a metal: iron, cobalt, manganese, $m$ is 0 or 1, $n$ is 1, 2 or 3.

As examples of complexes of formula $F_1$, there can be mentioned as non-limitative examples:

the tris (N alkylsalicylaldimino) Fe III compounds with $m = 0$; $n = 3$; $R = H$, methyl; $X = H$; $M = Fe$ the tris (N alkylsalicylaldimino) Co III compounds with $m = 0$; $X = H$; $n = 3$; $M = Co$ and $R = H$, methyl, ethyl, n-propyl.

As examples of complexes of formula $F_2$, there can be mentioned:

the N N' bis (salicylidene)ethylene diamino Fe III, Co III or Mn III compounds,
with $m = 1$; $B = CH_2-CH_2$; $X = H$; $mA^- = Cl^-$, acetate$^-$; $M = Fe$, Co, Mn.

2. The iron, cobalt, manganese or copper dialkyldithiocarbamates having the general formula:

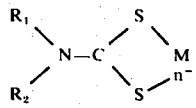

or $(R_1 R_2 n - C S_2)_n M$ and in which $R_1$ and $R_2$ are each a monovalent alkyl, aryl, aralkyl or alkyl aryl radical containing from 1 to 20 carbon atoms per molecule, $R_1$ and $R_2$ being either the same or different.

$n$ is 2 or 3, M is iron, cobalt, manganese or copper. As examples, there can be mentioned: iron dimethyldithiocarbamate, manganese dimethyldithiocarbamate, copper dimethyldithiocarbamate, iron diethyldithiocarbamate, manganese diethyldithiocarbamate, copper diethyldithiocarbamate, iron dipropyldithiocarbamate, manganese dipropyldithiocarbamate, copper dipropyldithiocarbamate, cobalt dimethyldithiocarbamate, cobalt diethyldithiocarbamate, cobalt dipropyldithiocarbamate, etc.

3. The iron, cobalt, manganese or copper alkylxanthates of the formulae:

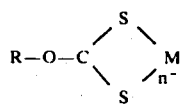

or $(R O C S_2)_n M$ in which R is an alkyl or aryl radical containing from 1 to 20 carbon atoms per molecule, $n$ is 2 or 3 and M is iron, cobalt, manganese or copper.

As examples there can be mentioned the iron methylxanthates, manganese methylxanthates, copper methylxanthates, cobalt methylxanthates, iron ethylxanthates, manganese ethylxanthates, copper ethylxanthates, cobalt ethylxanthates, and the like.

4. The iron, cobalt, manganese or copper dithiolates of the formula:

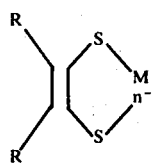

in which $R = CN^-$, H, $C_6H_5$, $CH_3$ or $CF_3$ $n = 2$ or 3 and $N = Fe$, Co, Mn or Cu.

There can also be mentioned iron diphenyldithiolate, manganese diphenyldithiolate and copper diphenyldithiolate.

5. The iron, copper or manganese 8-hydroxyquinolinates.

The various mentioned catalysts have been prepared according to usual procedures.

The dithiocarbamates, for example, are prepared from a solution of a sodium dialkyldithiocarbamate and of a salt having a convenient pH, or more directly from a solution of secondary amine, carbon sulfide and a soluble metal salt. The xanthates are prepared similarly from the potassium xanthates for example.

The salicylaldimides are for example obtained from alcoholic solutions of conveniently substituted salicylic aldehyde, the selected amine and a soluble metal salt.

The diphenyldithiolates are prepared by action of a metal chloride on a diphenyldithiol solution, for example prepared in situ.

The compounds obtained by more sophisticated processes producing complexes with the metal at a determined oxidation degree and making use of the same coordinates are also active.

The described catalyst may be introduced into the solution as such or as a mixture of its constituting elements. The catalyst concentration in the medium may vary from 0.001 to 20% by weight of the solution and more particularly from 0.01 to 5% by weight.

The oxygen concentration in the gas at the inlet of the reactor must be such that $H_2S/O_2 \leq 2$. An insufficient amount of oxygen with respect to the reaction stoichiometry:

$$2 H_2S + O_2 \rightarrow S_2 + 2 H_2O$$

reduces the removal of the hydrogen sulfide. The excess of oxygen with respect to the stoichiometrical amount may advantageously be limited to 10%.

The sulfur formed during the reaction crystallizes within the reaction medium into crystals having a sufficient size for being removed for example by a mere conventional filtration.

According to another embodiment, the reaction catalyst consists of at least one salt of a transition metal of the general formula $MX_m$, in which M is the selected transition metal (iron, manganese, copper or cobalt), X is the selected anion ($Cl^-$, $Br^-$, $ClO_4^-$, $NO_3^-$ or $SCN^-$), $m$ is 2 or 3.

The use as catalysts of these transition metal salts, more soluble (and cheaper) than the compounds hereinbefore mentioned, may result in an increase of the reaction velocity.

These salts are in a dissolved state in the reaction solution; moreover, there is formed a complex with the solvent which may be represented by the general raw formula:

$$M X_m L_n$$

in which M is the transition metal, X is the anion and L is an organic coordinate (amide, phosphoramide, sulfoxide, nitrile, ether), $m$ is 2 or 3, $n$ having one of the values 2, 4 and 6.

By way of non limitative examples, there can be mentioned:

trichloro bis (dimethylformamido) Fe III = $FeCl_3$, 2 DMF trichloro bis (hexamethylformamido) Fe III = $FeCl_3$, 2 HMPT tribromo bis (dimethylformamido) Fe III = $FeBr_3$, 2 DMF trichloro bis (dimethylsulfoxide) Fe III = $FeCl_3$, 2 DMSO trichloro bis (N methylpyrrolidone) Fe III = Fe Cl$_3$, 2 NMP dichloro bis (dimethylformamido) Fe II = Fe Cl$_2$, 2 DMF dichloro bis (dimethylformamido) Mn II = Mn Cl$_2$, 2 DMF dichloro bis (hexamethylphosphoramido) Mn II = Mn Cl$_2$, 2 HMPT dichloro bis (dimethylsulfoxide) Mn II = Mn Cl$_2$, 2 DMSO trinitratohexa (dimethylformamido) Fe III = Fe(NO$_3$)$_3$(DMF)$_6$ These complexes may be obtained for example by dissolving the metal salt into the coordinate and precipitating by adding to the solution a non-solvent such as ether, for example.

The ferric chloride complexes may also be obtained by adding the coordinate to a solution of Fe Cl$_3$ in ether.

The described catalyst may be introduced into the solution as such or as a mixture of its constituting elements. In the case where the selected solvent may also be one of the above-mentioned coordinates, it simply suffices to dissolve the metal salt into the solvent, the complex formation being achieved in situ. (Of course, the selected coordinate may be different from the solvent).

For example, the mere dissolution of ferric chloride in dimethylformamide will result in the formation of a complex FeCl$_3$, 2 DMF which catalyzes the oxidation of hydrogen sulfide to sulfur and water.

The other conditions of use of the catalyst are the same as for the above-mentioned catalyst of the chelate type.

The present invention is applicable in particular to the removal of H$_2$S from a refinery gas or from an effluent of a Claus unit (unit for manufacturing sulfur by thermal and catalytic treatment of a mixture of H$_2$S and SO$_2$).

The invention will be illustrated by the following examples which are not limitative of the scope thereof.

EXAMPLE 1

In a reactor having a 1 liter capacity, we introduce 0.5 liter of dimethylformamide in which is dissolved 2g of iron tris (diethyldithiocarbamate) of the formula:

[(C$_2$H$_5$)$_2$N — C S$_2$]$_3$ Fe

The reactor is brought to a temperature of 30°C. Then we introduce, into the free part of the reactor, a mixture of oxygen and hydrogen sulfide, in a ratio of H$_2$S to O$_2$ of about 2. The total pressure in the reactor is 870mmg Hg. Stirring is achieved in the reactor by means of a magnetically driven stirrer. We observe that the pressure decreases in the reactor. It is maintained constant by means of a permanent supply of the mixture of H$_2$S and O$_2$. After consumption of 0.1 mole of hydrogen sulfide we recover, by filtration and determination of the uncombined dissolved sulfur, 3.1 g of sulfur, which corresponds to 97% of the sulfur theoretically produced from the consumed hydrogen sulfide.

EXAMPLE 2

We proceed as in the preceding example, but with dimethylformamide containing 30% of water. The recovered sulfur amounts to 97.3% of the theoretical sulfur.

EXAMPLE 3

We proceed as in example 1, but we use dimethylsulfoxide as solvent. The recovered sulfur amounts to 98% of the theoretical sulfur.

EXAMPLE 4

Example 1 is repeated except that we use as catalyst 3.5 g of manganese bis (diethyldithiocarbamate)

[(C$_2$H$_5$)$_2$N C S$_2$]$_2$Mn.

After 0.1 mole of hydrogen sulfide has been consumed, the recovered sulfur amounts to 97% of the theoretical sulfur.

EXAMPLE 5

We introduce the catalyst solution consisting of dimethylformamide having a 0.7% by weight of chloro [N N' ethylene bis (salicylideneiminato)] cobalt, of the formula

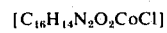
[C$_{16}$H$_{14}$N$_2$O$_2$CoCl]

into a reactor consisting of an open tube of a 5 cm diameter provided at its base with a gas distribution system formed of fritted glass.

We use 1 liter of solution and maintain the temperature at 40°C. The reactor is fed with a gaseous mixture having the following composition:

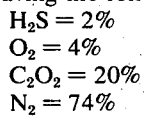
H$_2$S = 2%
O$_2$ = 4%
C$_2$O$_2$ = 20%
N$_2$ = 74%

In the outlet effluent from the reactor the H$_2$S content is lower than 0.01%. The selectivity of the conversion to sulfur is about 96%.

EXAMPLE 6

In the same reactor as defined in example 5, we introduce 1 liter of a solution of dimethylacetamide having a 10% content of copper dibutyldithiocarbamate of the formula [(C$_4$H$_9$)$_2$NC S$_2$]$_2$Cu. All other conditions being the same as in example 5, the rate of removal of H$_2$S is close to 80%. The selectivity of the conversion to sulfur is higher than 97%.

EXAMPLE 7

In the reactor defined in example 5, we introduce a solution of dimethylformamide containing 12% of water and 2% by weight of iron tris (pyrrolidinyldithiocarbamate) of the formula (C$_5$H$_8$N S$_2$)$_3$Fe. The temperature is maintained at 50°C and the reactor is fed with a gas having the following composition:

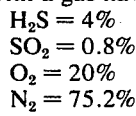
H$_2$S = 4%
SO$_2$ = 0.8%
O$_2$ = 20%
N$_2$ = 75.2%

The outlet effluent from the reactor has a H$_2$S content lower than 0.01%.

After a run of 2 hours, the catalyst activity is unchanged.

EXAMPLE 8

In a reactor having a 1 liter capacity, we introduce 0.5 liter of dimethylformamide in which are dissolved 8.4 g of trichloro bis (dimethylformamide) Fe III (FeCl$_3$, 2 DMF). The temperature of the reactor is brought to 30°C. A gas consisting of hydrogen sulfide and oxygen in a ratio H₂S/O₂ equal to 1, is then bubbled through the solution. Stirring in the reactor is achieved by means of a magnetically driven stirrer.

After consumption of 0.1 mole of H₂S, we recover by filtration and determination of the uncombined dissolved sulfur, 3.15 g of sulfur, which corresponds to 98.5% of the sulfur theoretically produced from the consumed H₂S.

EXAMPLE 9

The preceding example is repeated except that we had as catalyst 4.05 g of ferric chloride. After consumption of 0.1 mole of H₂S, the recovered sulfur amounts to 98% of the theoretical sulfur.

EXAMPLE 10

We proceed as in example 9, except that we use as solvent dimethylsulfoxide. The recovered sulfur amounts to 97% of the theoretical sulfur.

EXAMPLE 11

We proceed as in example 8, but by adding as catalyst 3.1 g of manganese chloride (MnCl₂).

After consumption of 0.1 mole of H₂S, we recover 3.10g of sulfur corresponding to 97% of the theoretical amount.

EXAMPLE 12

In the reactor defined in example 8, we introduce a solution of dimethylformamide containing 1% by weight of FeCl₃. Through the solution is bubbled a gaseous mixture having the following composition:

H₂S = 4%
SO₂ = 1.5%
O₂ = 20%
N₂ = 74.5%

The H₂S content of the reactor outflow is lower than 0.01%. After a run of 2 hours, the catalyst activity remains unchanged.

What we claim is:

1. A process which comprises catalytically oxidizing hydrogen sulfide to sulfur by means of molecular oxygen, in homogeneous liquid phase, in an organic solvent having a water content not in excess of 60% by volume during the reaction, said solvent being of the basic type selected from the group consisting of amides, phosphoramides, sulfoxides, nitriles and ethers, and as a catalyst an iron dialkyldithiocarbamate, said sulfur produced thereby being pure, crystalline and easily recoverable.

2. A process according to claim 1, conducted at a temperature from 5° to 180°C.

3. A process according to claim 1, in which the catalyst content is from 0.001 to 20% by weight, with respect to the solvent.

4. A process according to claim 1, in which the solvent is dimethylformamide.

5. A process according to claim 1, in which the catalyst has the general formula:

$$[(C_2H_5)_2N - C\ S_2]_3\ Fe.$$

6. A process as defined by claim 1 wherein the process is conducted in a reactor and the ratio H₂S : O₂ is less than or equal to 2.

7. A process according to claim 6, in which the catalyst content is from 0.001 to 20% by weight, with respect to the solvent.

8. A process according to claim 6, in which the catalyst content is from 0.01 to 5% by weight, with respect to the solvent.

* * * * *